A. M. Glover.
Paddle Wheel.

Nº 13,058. Patented Jun. 12, 1855.

UNITED STATES PATENT OFFICE.

AUGUSTUS M. GLOVER, OF WATERBORO, SOUTH CAROLINA.

BUCKET OF PADDLE-WHEELS.

Specification of Letters Patent No. 13,058, dated June 12, 1855.

*To all whom it may concern:*

Be it known that I, AUGUSTUS M. GLOVER, of Waterboro, in the district of Colleton and State of South Carolina, have invented certain new and useful Improvements in Paddle-Wheels; and I do hereby declare that the following is a full, clear, and exact description thereof, reference being had to the accompanying drawings, forming a part of this specification.

The nature of my improvement consists in making the face of the paddle concave by embracing the arc of a circle between its ends, while the back of the paddle is a plane surface, or a straight line between its ends. The advantages of the concave face of concentrating to a focus the force upon the water when the wheel is used for propelling forward is combined with the preservation of the plane upon the back of the paddle, so necessary to prevent the slip arising from paddles formed with a concave face and convex back. By disposing of the paddles upon the wheels so that the number of paddles in the water may be alternated, I sensibly relieve the shock upon the engine.

Figure 1:
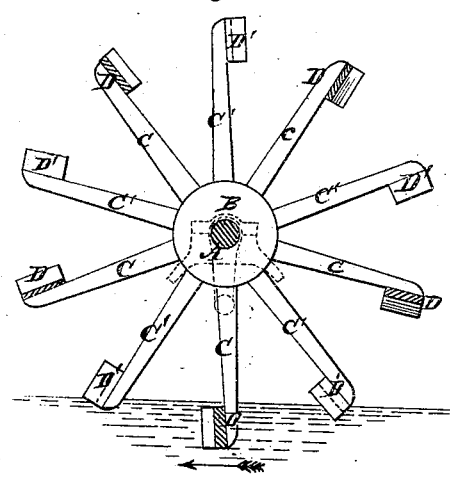
Figure 2:
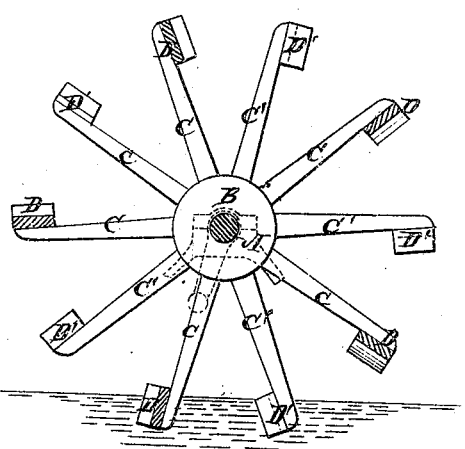
Figure 3:
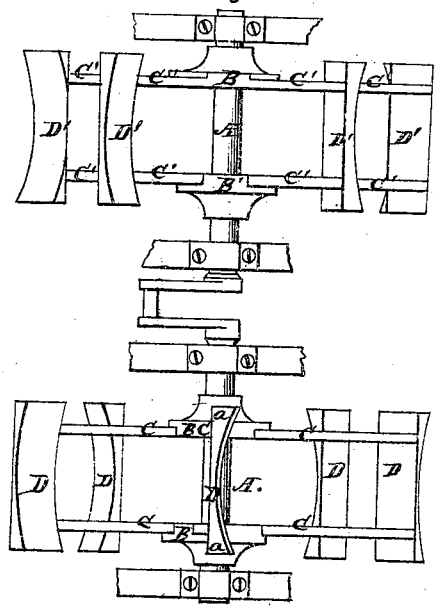

To enable others skilled in the art to construct the paddles and arrange them upon the wheels I would describe them as follows: The paddles may be of wood or metal and instead of being planes upon both sides, or a concave on one and a corresponding convex on the other, they are made with a concave upon the front side of the paddle and a plane upon the rear of each paddle. By this form, which may be called a plano-concave, the action of the paddle is maintained upon the water. In my arrangement of the arms C, representing the wheel of one side, with the arms C', that of the other side of the vessel, it will be noticed in Figure 1 that the paddles D D on one side, are above the water, while D of the other side is at full dip and in Fig. 2 that paddle D of one side and D' of the other are equally acting upon the water. The effect thus produced upon the engine greatly relieves it from strain and consequent shock to the vessel.

The improvement to the paddle wheels of steamers is an important one, and any changes by which the action of the paddles upon the water effects it is deserving consideration. The form I present, viz. the plano-concave, is the result of experiments instituted to secure the desirable speed, without excess of power being expended.

I am aware that concave and corresponding convex faces of the paddle have been used, but they are liable to the objection before stated.

Having described my improvement in paddle wheels, for steam boats, &c., what I claim as my invention and desire to secure by Letters Patent is—

The giving such form viz, a plano-concave to the paddle, that all the advantage of the concave is secured without loss of hold upon the water and slip in backing vessels propelled by wheels, substantially in the manner set forth.

In testimony whereof I have hereunto signed my name before two subscribing witnesses.

A. M. GLOVER.

Witnesses:
W. S. CLARK,
SAML. GRUBB.